(12) United States Patent
Tsuruoka et al.

(10) Patent No.: US 10,891,079 B2
(45) Date of Patent: Jan. 12, 2021

(54) INFORMATION PROCESSING APPARATUS

(71) Applicant: FUJI XEROX CO., LTD., Tokyo (JP)

(72) Inventors: Hiroyuki Tsuruoka, Kanagawa (JP); Mamoru Mochizuki, Kanagawa (JP); Yoshinori Shiraishi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 21 days.

(21) Appl. No.: 16/386,379

(22) Filed: Apr. 17, 2019

(65) Prior Publication Data

US 2020/0183617 A1 Jun. 11, 2020

(30) Foreign Application Priority Data

Dec. 7, 2018 (JP) ................................. 2018-229770

(51) Int. Cl.
*G06F 3/06* (2006.01)
*G06F 3/12* (2006.01)
*G06K 15/02* (2006.01)

(52) U.S. Cl.
CPC .......... *G06F 3/0659* (2013.01); *G06F 3/0611* (2013.01); *G06F 3/0656* (2013.01); *G06F 3/0679* (2013.01); *G06F 3/1215* (2013.01); *G06F 3/1251* (2013.01); *G06K 15/1886* (2013.01)

(58) Field of Classification Search
CPC .... G06F 3/0659; G06F 3/0611; G06F 3/0656; G06F 3/1251; G06F 3/1215; G06F 3/0679; G06K 15/1886
See application file for complete search history.

(56) References Cited

U.S. PATENT DOCUMENTS

| | | | |
|---|---|---|---|
| 8,762,628 B2 | 6/2014 | Kurashige | |
| 2012/0278538 A1* | 11/2012 | Nango | G06F 12/0246 711/103 |
| 2015/0071003 A1* | 3/2015 | Numata | G06F 12/0246 365/185.18 |
| 2016/0284402 A1* | 9/2016 | Kanai | G11C 13/0038 |
| 2018/0211696 A1* | 7/2018 | Kim | G11C 7/1072 |
| 2018/0276152 A1* | 9/2018 | Omori | G06F 3/0656 |

FOREIGN PATENT DOCUMENTS

| | | |
|---|---|---|
| JP | 2012-230554 A | 11/2012 |
| JP | 2013-65060 A | 4/2013 |
| WO | 2015/029230 A1 | 3/2015 |

\* cited by examiner

*Primary Examiner* — Neil R McLean
(74) *Attorney, Agent, or Firm* — Oliff PLC

(57) ABSTRACT

An information processing apparatus includes a non-volatile semiconductor storage device including a flash memory, a write buffer memory that stores data that is to be stored onto the non-volatile semiconductor storage device, and a controller that performs control to write in a batch onto the non-volatile semiconductor storage device the data stored on the write buffer memory when an amount of the data stored on the write buffer memory reaches a predetermined amount of data.

10 Claims, 13 Drawing Sheets

FIG. 8

| CONDITION | WRITING SPEED | READING SPEED |
|---|---|---|
| SEQUENTIAL WRITE AND READ PERFORMANCE (STANDARD RATING) | 920 MB/s | 1070 MB/s |
| CONFIGURATION WITHOUT WRITE BUFFER 43 AND READ BUFFER 45 | 450 MB/s | — |
| CONFIGURATION WITH WRITE BUFFER 43 AND READ BUFFER 45 (CONFIGURATION OF FIRST EXEMPLARY EMBODIMENT) | 770 MB/s | — |

INFORMATION PROCESSING APPARATUS

CROSS-REFERENCE TO RELATED APPLICATIONS

This application is based on and claims priority under 35 USC 119 from Japanese Patent Application No. 2018-229770 filed Dec. 7, 2018.

BACKGROUND

(i) Technical Field

The present disclosure relates to an information processing apparatus.

(ii) Related Art

Japanese Unexamined Patent Application Publication No. 2012-230554 discloses a data storage device. In accordance with the disclosure, the data storage device writes data of a one physical page unit by a single access by parallelizing a write sequence on a flash memory chip. The data storage device thus performs a write operation in a shorter period of time.

Japanese Unexamined Patent Application Publication No. 2013-065060 discloses an information processing apparatus. The information processing apparatus controls in the overall throughput thereof a decrease that results from response performance degradation of a solid state drive (SSD) controller caused by issuing too many write commands. The information processing apparatus controls the decrease in the throughput thereof by restricting the number of write commands by imposing a limit on the number of issues of write commands.

WO2015/029230 discloses a memory device that increases storage response performance by reducing the number of executions of an error correction operation through an error correcting code (ECC) of a flash memory.

SUMMARY

Aspects of non-limiting embodiments of the present disclosure relate to an information processing apparatus that increases a write speed to a non-volatile semiconductor storage device when data transmitted from a preceding stage is written on the non-volatile semiconductor storage device in comparison with the case in which the data transmitted from the preceding stage is successively written on the non-volatile semiconductor storage device in steps of a data unit of the data.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus. The image processing apparatus includes a non-volatile semiconductor storage device including a flash memory, a write buffer memory that stores data that is to be written onto the non-volatile semiconductor storage device, and a controller that performs control to write, in a batch and onto the non-volatile semiconductor storage device, the data stored on the write buffer memory when an amount of the data stored on the write buffer memory reaches a predetermined amount of data.

BRIEF DESCRIPTION OF THE DRAWINGS

Exemplary embodiments of the present disclosure will be described in detail based on the following figures, wherein:

FIG. 8 illustrates write speeds and read speeds compared between the configurations;

DETAILED DESCRIPTION

Exemplary embodiments of the disclosure are described below in accordance with the drawings.

First Exemplary Embodiment

Figure 1:
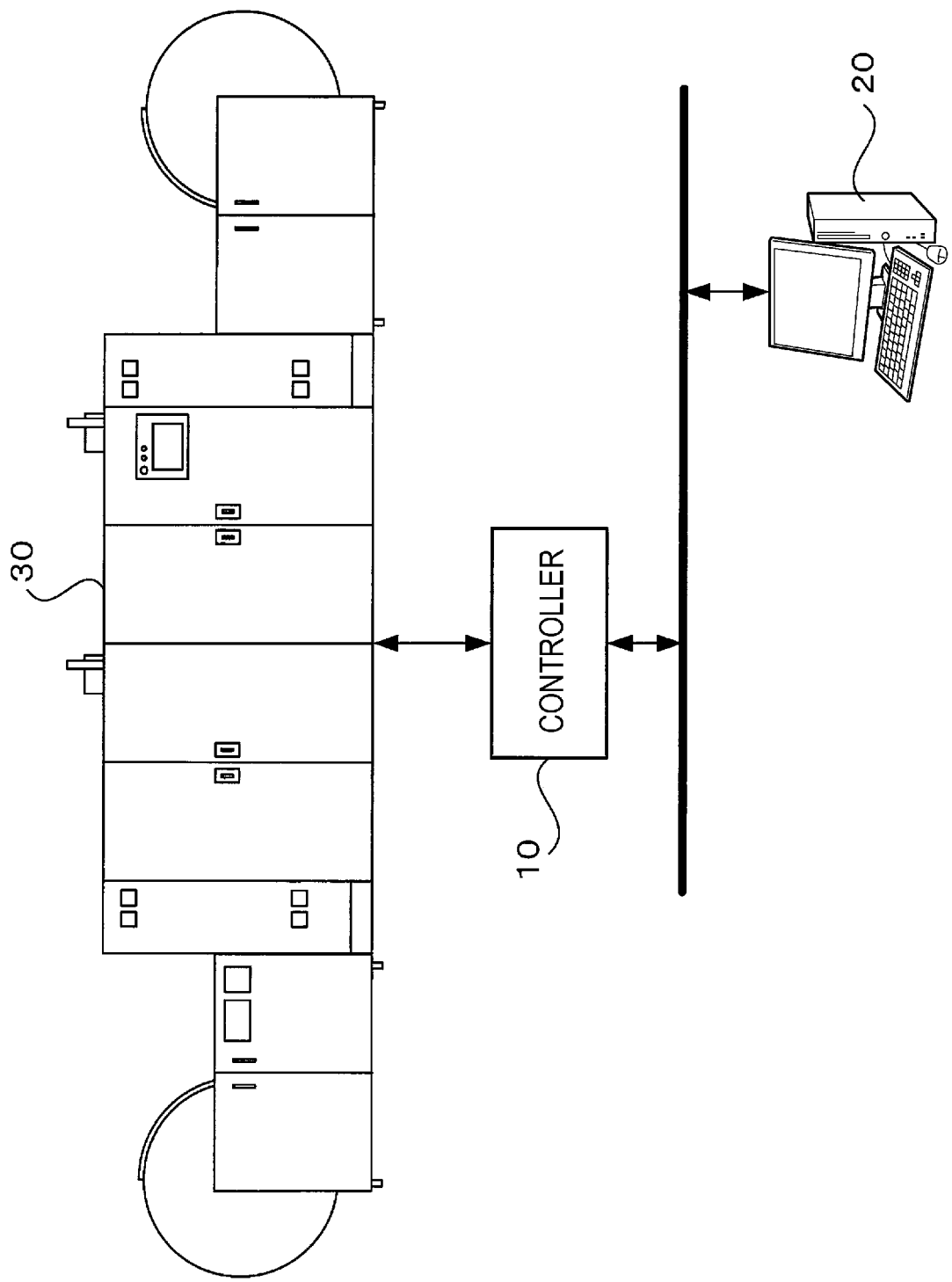
FIG. 1 illustrates a system configuration of an image forming system of a first exemplary embodiment of the disclosure.

FIG. 1 illustrates a system configuration of an image forming system of a first exemplary embodiment of the disclosure.

Referring to FIG. 1, the image forming system of the first exemplary embodiment of the disclosure includes a printer 30 that performs color printing on a continuous paper sheet, a controller 10 that performs control on the printing operation of the printer 30, and a terminal device 20. The controller 10 and the terminal device 20 are connected to each other via a network.

The terminal device 20 generates a print job (a print request) and transmits the print job to the controller 10 via the network. The controller 10 controls the printing operation of the printer 30 in response to the print job transmitted from the terminal device 20. Under the control of the controller 10, the printer 30 outputs an image on the continuous paper sheet in response to the print job.

Since the print speed of the printer 30 that performs the printing operation on the continuous paper sheet is relatively higher, the controller 10 performs high-speed image processing. For this reason, the controller 10 attains a relatively higher image-processing speed by performing parallel image processing.

In the printing operation on the continuous paper sheet, it is difficult to immediately suspend the transportation of the continuous paper sheet even if the print data is not transferred in time from the controller 10 to the printer 30. This may result in a large amount of white page sections that could be useless. The controller 10 thus performs spool control to store print data subsequent to the image processing.

In the spool control of the related art, multiple hard disk drives (HDDs) are combined in a configuration of redundant arrays of inexpensive (independent) disks (RAID) to store image processed print data. Specifically, the spool control is performed on the print data by using disk striping (RAID 0) that spreads data of each page across multiple HDDs for storage.

Higher performance is desirable on the spool control as the printer 30 is increased in speed and resolution. In a continuous paper sheet printer that is difficult to quickly suspend in operation, the transfer speed of the print data enabling the printing operation to be continued without a cessation is predetermined. Such a transfer speed is to be guaranteed in the spool control.

The spool control of the related art attains the transfer speed by deploying many HDDs. Recently, however, the HDD has been replaced with a solid state drive (SSD) with the advance of the SSD as a semiconductor storage device.

SSDs have a write speed and a read speed several times higher than those of HDDs. For example, the RAID 0 configuration including eight HDDs may be equivalently replaced with two SSDs.

The SSD includes a NAND-type flash memory as a memory element. The SSD is different from the HDD in characteristics. For example, the SSD is characteristic of being subject to a limit on the number of rewrite cycles and is characteristic of the write speed slower than the read speed. Simply performing control similar to the control of HDD of the related art is not sufficient.

The controller 10 of the exemplary embodiment performs the spool control of the print data by using the SSD in the control described below.

Figure 2:
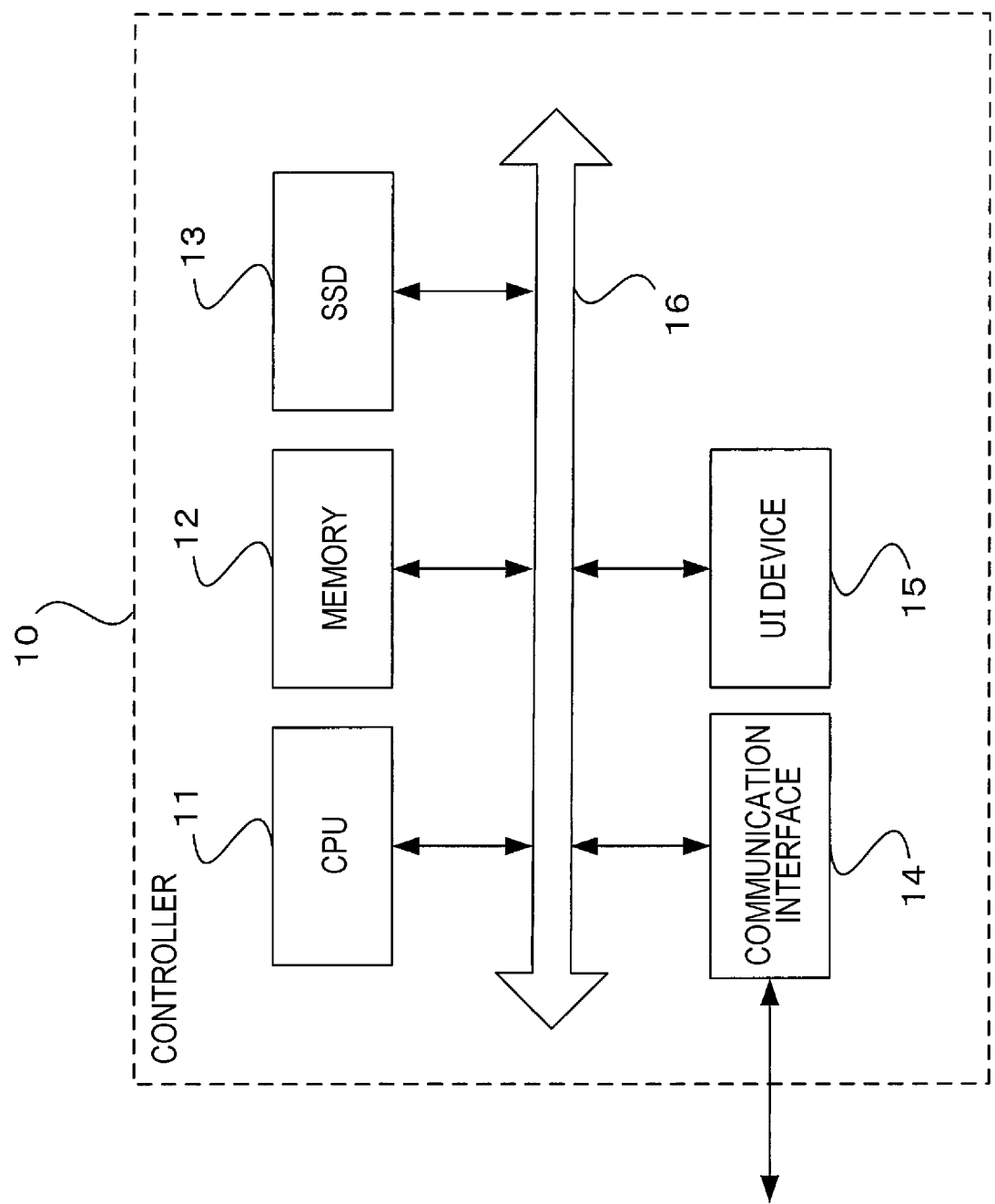
FIG. 2 is a block diagram illustrating a hardware configuration of a controller of the first exemplary embodiment of the disclosure.

FIG. 2 is a block diagram illustrating a hardware configuration of the controller 10 of the first exemplary embodiment of the disclosure.

Referring to FIG. 2, the controller 10 includes a central processing unit (CPU) 11, a memory 12, a solid state drive (SSD) 13, a communication interface (IF) 14, and a user interface (UI) device 15. The SSD 13 is a non-volatile semiconductor storage device that includes a NAND-type flash memory. The communication interface 14 transmits data to or receives data from an external device via a network. The UI drive 15 includes a touch panel or a liquid-crystal display and a keyboard. These elements are interconnected to each other via a control bus 16.

The CPU 11 performs a specific process in accordance with a control program stored on the memory 12 or the SSD 13, thereby controlling the operation of the controller 10. In accordance with the exemplary embodiment, the CPU 11 reads and executes the control program stored on the memory 12 or the SSD 13. Alternatively, the control program may be stored on a storage medium, such as a compact disk read-only memory (CD-ROM) and may be supplied to the CPU 11.

Figure 3:
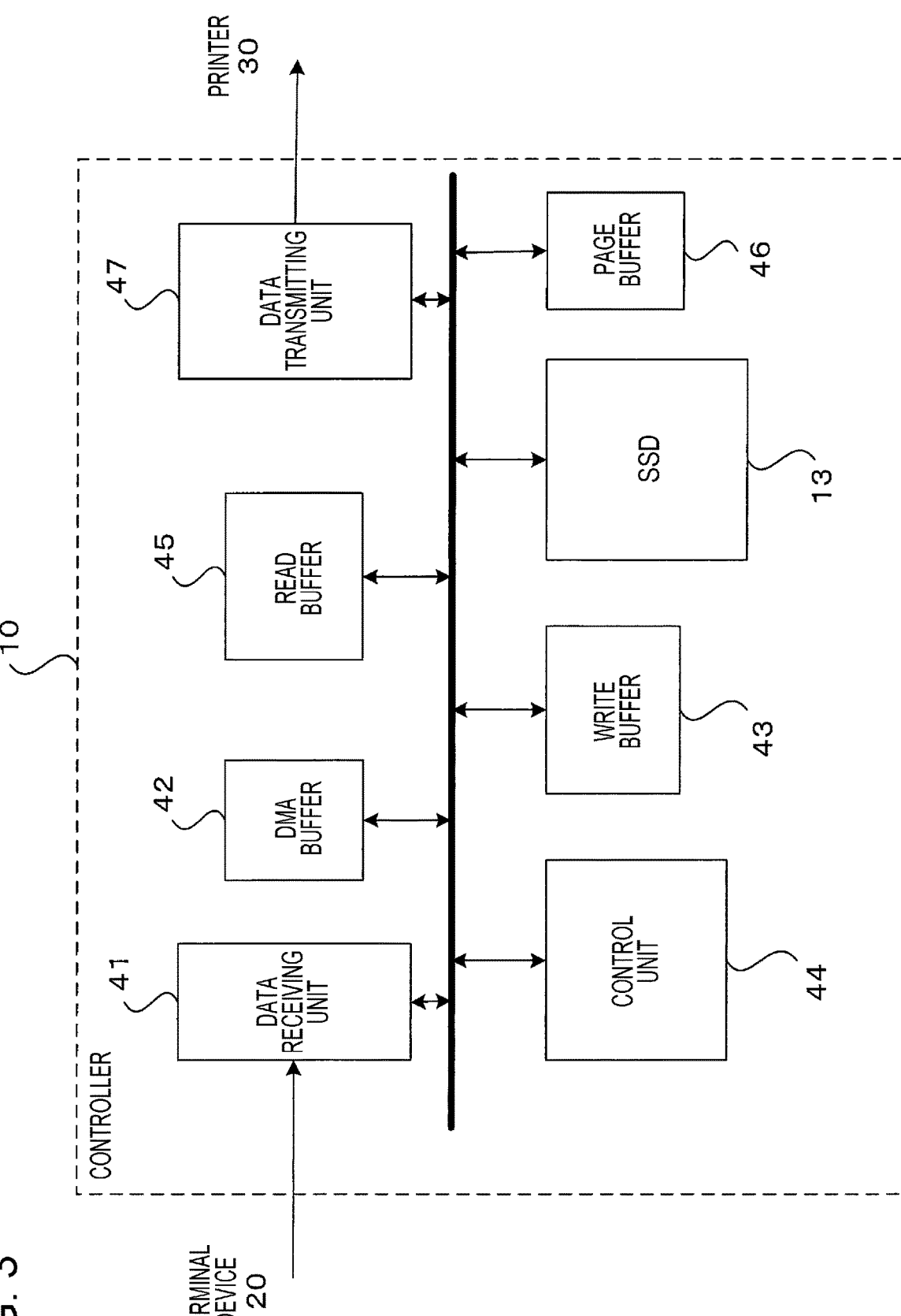
FIG. 3 is a functional block diagram illustrating the controller of the first exemplary embodiment of the disclosure.

FIG. 3 is a block diagram of the function of the controller 10 that may be implemented by performing the control program.

Referring to FIG. 3, the controller 10 of the first exemplary embodiment includes a data receiving unit 41, a direct memory access (DMA) buffer 42, a write buffer 43, a control unit 44, a read buffer 45, a page buffer 46, a data transmitting unit 47, and the SSD 13.

In the discussion that follows, the buffer memory is simply referred to as a buffer. In accordance with the exemplary embodiments, unit 1 GB means 1 GiB (gibibyte, namely $2^{30}$ bytes). In the following discussion, 1 GiB is simply referred to as 1 GB. Similarly, 1 TB and 1 MB mean 1 TiB (tebibyte, namely $2^{40}$ bytes) and 1 MiB (mebibytes, namely 220 bytes), respectively. In the following discussion, 1 TiB and 1 MiB are simply referred to as 1 TB and 1 MB, respectively.

The data receiving unit 41 receives the print data transmitted from the terminal device 20.

The DMA buffer 42 has a storage capacity of 32 GB and is an input data storage unit that successively stores the print data from the terminal device 20 as a preceding stage in steps of a data unit, namely a page unit forming the print data.

The control unit 44 performs image processing to convert the print data received from the data receiving unit 41 into data in a raster format and stores the image-processed print data on the DMA buffer 42.

The write buffer 43 temporarily stores data to be written later on the SSD 13.

The control unit 44 successively transfers the data stored on the DMA buffer 42 to the write buffer 43 in steps of a page unit. When the amount of the data stored on the write buffer 43 reaches a predetermined amount of data, specifically, 1.5 GB that is the maximum storage capacity of the write buffer 43, the control unit 44 performs control to write the print data stored on the write buffer 43 onto the SSD 13 in a batch.

The read buffer 45 temporarily stores the data read from the SSD 13.

The page buffer 46 has a storage capacity of 4.5 GB and successively stores in steps of the page unit the print data that is to be later transmitted to the printer 30 as a succeeding stage.

The data transmitting unit 47 successively transmits the print data stored on the page buffer 46 to the printer 30 in steps of the page unit.

The control unit 44 performs control to read from the SSD 13 the predetermined amount of the print data, specifically, the print data of 1.5 GB in a batch and to store the data on the read buffer 45. The control unit 44 performs control to successively transfer the print data stored on the read buffer 45 to the page buffer 46 as a succeeding stage in steps of the page unit. The amount of print data being 1.5 GB that the control unit 44 has read from the SSD 13 in a batch is a maximum storage capacity of the read buffer 45.

In accordance with the exemplary embodiment, the data size of the print data of one page is obtained by compressing image data having a resolution of 1200 dot per inch (dpi)× 1200 dpi for a page size of a width of 12 inches and a length of 21.5 inches. The data size of the print data is thus 96 MB.

The transfer of the print data to the DMA buffer 42 and the transfer of the print data from the DMA buffer 42 to the write buffer 43 are performed in steps of a 96 MB unit serving as a page unit. Similarly, the transfer of the print data the read buffer 45 to the page buffer 46 and the transfer of the print data from the page buffer 46 to the data transmitting unit 47 are performed in steps of a 96 MB unit serving as a page unit.

In accordance with the first exemplary embodiment, the maximum storage capacity of each the write buffer 43 and the read buffer 45 is 1.5 GB. When the amount of the print data stored on the write buffer 43 reaches 1.5 GB, the control unit 44 performs a write operation by transferring the print data of 1.5 GB to the SSD 13 in a batch. The control unit 44 also reads the print data by the 1.5 GB unit from the SSD 13 in a batch and stores the read print data on the read buffer 45.

In accordance with the first exemplary embodiment, the predetermined amount of data in the writing of the print data in a batch from the write buffer 43 to the SSD 13 is 1.5 GB, which is the maximum storage capacity of the communication interface 14.

When the amount of data stored on the write buffer 43 reaches the maximum storage capacity thereof, the control unit 44 performs control to write the print data stored on the write buffer 43 onto the SSD 13 in a batch.

The amount of print data that the control unit 44 writes on the SSD 13 in a batch from the write buffer 43 is 1.5 GB and is set because of the following reason. Specifically, the data amount of 1.5 GB is configured such that a write speed to the SSD 13 is faster than a write speed at which the print data stored on the DMA buffer 42 as a preceding stage prior to the write buffer 43 is directly written on the SSD 13 in steps of a page with each page being 96 MB. Since the writing of the print data on the SSD 13 and the reading of the print data from the SSD 13 are performed in steps of 1.5 GB, the write speed is faster than when the writing and the reading of the print data is performed in steps of 96 MB. The reason for this is described below.

The amount of data is configured to be larger as the storage capacity of the SSD 13 on which the print data is written is larger.

In accordance with the first exemplary embodiment, the maximum storage capacity of the write buffer 43 and the maximum storage capacity of the read buffer 45 are substantially equal to each other, namely, equal to 1.5 GB.

The control unit 44 alternates between writing the print data on the SSD 13 and reading the print data from the SSD 13.

Figure 4:
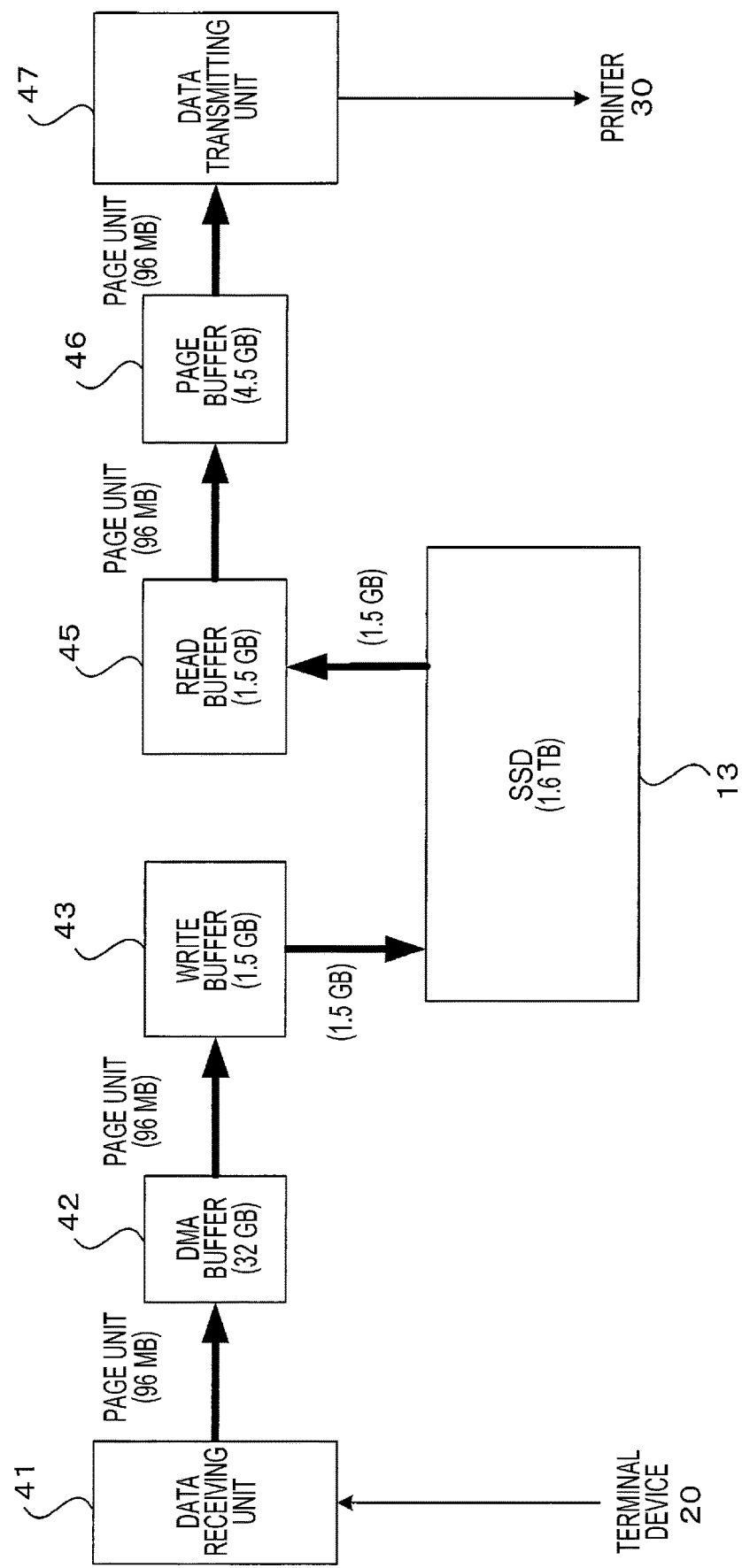
FIG. 4 illustrates the way in which print data received by a data receiving unit is written on a solid state drive (SSD) via a direct memory access (DMA) buffer and a write buffer, and the print data read from the SSD is transmitted from a data transmitting unit to a printer via a read buffer and a page buffer.

FIG. 4 illustrates the way in which the print data received by the data receiving unit 41 is written on the SSD 13 via the DMA buffer 42 and the write buffer 43, and The print data read from the SSD 13 is transferred from the data transmitting unit 47 to the printer 30 via the read buffer 45 and the page buffer 46.

Referring to FIG. 4, the print data that the data receiving unit 41 has received from the terminal device 20 is written in steps of a page unit of 96 MB on the DMA buffer 42, the data is then read from the DMA buffer 42 and then written on the write buffer 43. When the amount of the print data stored on the write buffer 43 reaches 1.5 GB, the print data is written on the SSD 13 in a batch.

Referring to FIG. 4, the print data is read from the SSD 13. The print data of 1.5 GB is read from the SSD 13 in a batch and stored on the read buffer 45. The print data is then stored in steps of a page unit of 96 MB on the page buffer 46 and is then transferred to the printer 30 via the data transmitting unit 47.

The writing of the print data to the SSD 13 and the reading of the print data from the SSD 13 performed in steps of a unit of 1.5 GB leads to a higher write speed than the writing and reading of the print data performed in steps of a unit of 96 MB. The reason for this is described below.

A block erase operation and a program write operation are performed to write data on the NAND-type flash memory used as the SSD 13 of the first exemplary embodiment.

The flash memory has a structure that allows written data to be erased in steps of a block unit only. To overwrite the data written on the flash memory, the written data is to be erased first. In view of this, to overwrite the written data in a given block, the following complex operation is to be performed. The data in the whole block is read and then stored. After the whole block is erased, a portion of the block to be rewritten is modified, followed by the data writing over the whole block.

The erasing of the data in steps of a block unit is the block erase operation, and the data writing in the procedure described above is the program write operation.

For this reason, the flash memory is characteristic of the data write operation thereof slower than the data read operation thereof.

According to the specifications of the SSD 13 of the first exemplary embodiment, a write speed of 920 MB/s and a read speed of 1070 MB/s are respectively specified as the sequential write performance and the sequential read performance.

The sequential write performance is defined by the write speed attained when a relatively larger amount of data is written on a continuous area. The sequential read performance is defined by the read speed attained when the relatively larger amount of data written on the continuous area is read.

The sequential write performance and the sequential read performance relate to speeds attained only when the relatively larger amount of data is continuously written or read. If the writing and reading of a relatively smaller amount of data are repeated, the write speed and read speed described above are difficult to attain.

Figure 5:
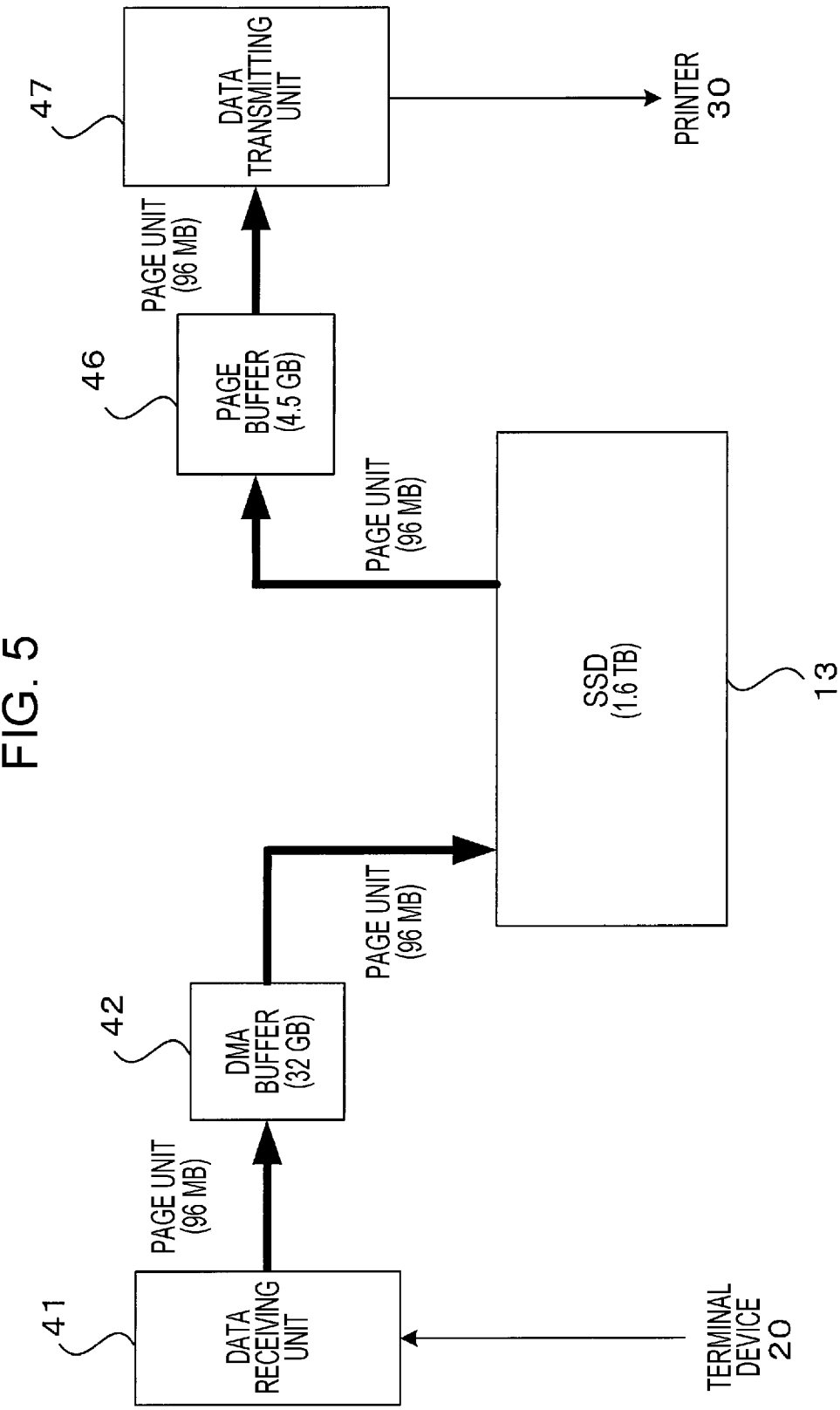
FIG. 5 illustrates for comparison purposes a configuration that is without the write buffer and the read buffer.

FIG. 5 illustrates a configuration without the write buffer 43 and the read buffer 45 for comparison purposes.

In the configuration without the write buffer 43 as illustrated in FIG. 5, the print data is directly transferred from the DMA buffer 42 to the SSD 13 in steps of a page unit (96 MB). In the configuration without the read buffer 45 as illustrated in FIG. 5, the print data is read from the SSD 13 in steps of a page unit (96 MB) and then stored on the page buffer 46. The writing of the print data from the DMA buffer 42 alternates with the reading of the print data to the page buffer 46.

Figure 6:
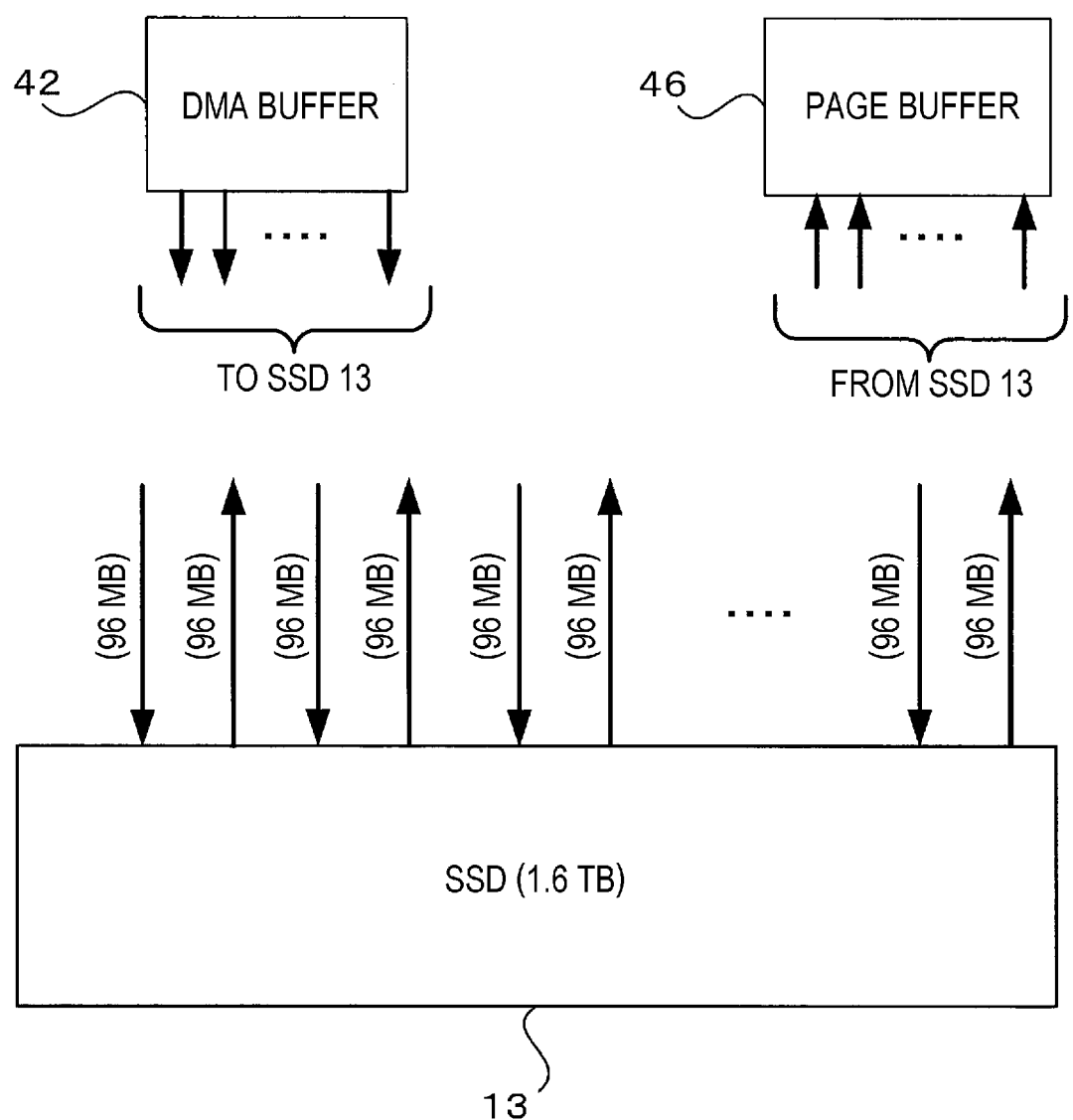
FIG. 6 illustrates the way in which a write operation to the SSD and a read operation from the SSD are performed in the configuration without the write buffer and the read buffer.

In the configuration without the write buffer 43 and the read buffer 45 as illustrated in FIG. 5, the writing of the print data of 96 MB and the reading of the print data of 96 MB are alternately performed as illustrated in FIG. 6.

The write speed actually measured with the writing of the print data to the SSD 13 alternating with the reading of the print data from the SSD 13 is 450 MB/s.

Specifically, the writing of the data of 96 MB takes about 213 ms, and the write speed computed in accordance with the following equation is about 450 MB/s.

$$96 \text{ MB} \times (1000/213) \approx 450 \text{ MB/s}$$

The write speed of 450 MB/s is approximately half (50%) the write speed of 920 MB/s described in the specifications of the SSD 13.

As described above, the flash memory is characteristic of the write speed thereof slower than the read speed thereof, and the following discussion focuses on the write speed.

Figure 7:
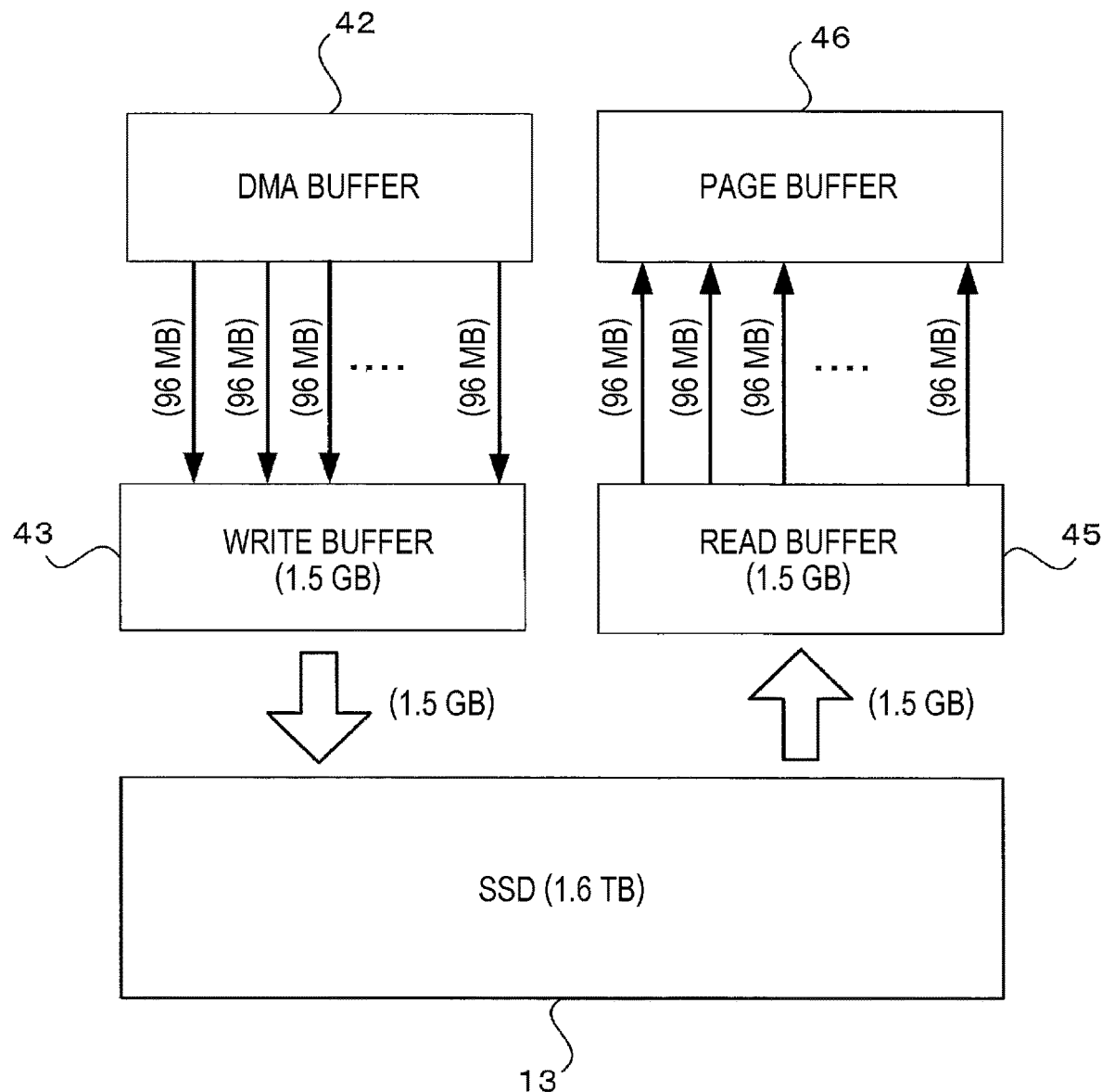
FIG. 7 illustrates the way in which a write operation to the SSD and a read operation from the SSD are performed in the configuration including the write buffer and the read buffer.

The controller 10 of the exemplary embodiment includes not only the DMA buffer 42 and the page buffer 46 but also the write buffer 43 and the read buffer 45. Referring to FIG. 7, the print data equal to 16 times the data amount of 96 MB from the DMA buffer 42 is stored on the write buffer 43. When the amount of print data stored on the write buffer 43 reaches 1.5 GB (96 MB×16), the control unit 44 writes the print data of 1.5 GB on the SSD 13 in a batch.

Inventors of the technique of the disclosure have learned the amount of print data that is to be written on the SSD 13 in a batch to attain a value close to a specified rating of 920 MB/s. The inventors have found that if the print data of 1.5 GB or larger is continuously written, the write speed will become closer to the specified rating of 920 MB/s.

Specifically, the data write time of 96 MB is about 124 ms, and the write speed is computed as about 770 MB/s in accordance with the following equation:

$$96 \text{ MB} \times (1000/124) \approx 770 \text{ MB/s}$$

A write speed of 770 MB/s is about 84% of the write speed of 920 MB/s as the specified rating of the SSD 13 and is higher than the write speed of 450 MB/s.

The table in FIG. 8 lists the write speed and the read speed in each of the configurations for comparison.

Referring to FIG. 8, the write speed of 770 MB/s is attained by storing the print data from the DMA buffer 42 on the write buffer 43 and by writing the print data on the SSD 13 in a batch when the print data on the DMA buffer 42 reaches 1.5 GB. The write speed of 770 MB/s is higher than the write speed of 450 MB/s that is attained when the print data is written in steps of 96 MB on the SSD 13 without using the write buffer 43.

Second Exemplary Embodiment

An image processing system of a second exemplary embodiment of the disclosure is described below.

The first exemplary embodiment described above includes a single SSD for convenience of explanation. In the spool control of the actual high-speed printer, many SSDs are employed. In accordance with the second exemplary embodiment of the disclosure, the spool control is performed using multiple SSDs.

Figure 9:
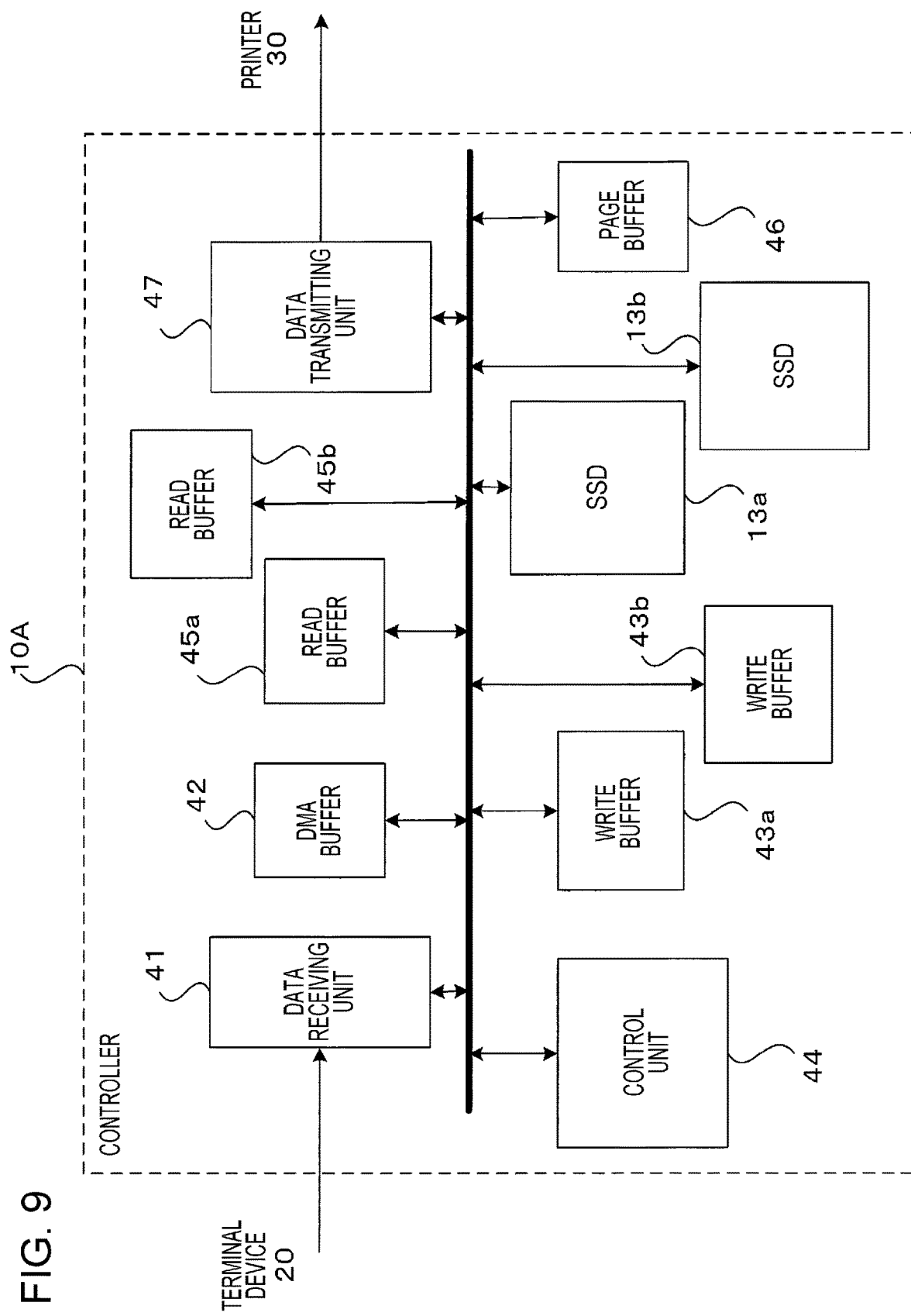
FIG. 9 is a functional block diagram illustrating a controller of a second exemplary embodiment of the disclosure.

The image forming system of the second exemplary embodiment includes in FIG. 9 a controller 10A that replaces the controller 10 in the image forming system of the first exemplary embodiment in FIG. 1. Referring to FIG. 9, elements identical to those illustrated in FIG. 3 with reference to the first exemplary embodiment are designated with the same reference numerals and the discussion thereof is omitted herein.

The controller 10A of the second exemplary embodiment includes two SSDs 13a and 13b and further includes two write buffers 43a and 43b and two read buffers 45a and 45b corresponding to the SSDs 13a and 13B.

The write speed and read speed are typically increased by using multiple storage devices in the RAID configuration. To perform the striping control (RAID 0), a RAID controller increases the write speed and read speed by spreading a single piece of data across multiple storage devices in writing and reading the data.

If the SSD is used as a storage device, and the data writing and reading are performed on the SSD in steps of 96 MB as illustrated in FIG. 6, desired performance is difficult to achieve even if multiple storage devices are used. This is because the SSD is characteristic of the write speed thereof slower than the read speed thereof, and if a relatively smaller amount of data is written on the SSD, the write speed varies from write operation to write operation. As a result, even if a parallel process is executed by using multiple SSDs in the RAID configuration, the next write operation is unable to begin until the SSD having the slowest write speed completes the write operation thereof. The overall write speed thus depends on the SSD having the slowest write speed. If the SSDs have varied write speeds, the overall write speed at each operation depends on the SSD having the slowest write speed. The improvement of the write speed by using multiple SSDs may not difficult to achieve as desired.

The currently available SSDs have storage capacities increasing in steps of twofold, for example, 400 GB, 800 GB, and 1600 GB (1.6 TB). For this reason, if a system is designed with a spool capacity of 2.4 TB, a desired spool capacity of 2.4 TB may be attained by using a combination of a 800 GB SSD and a 1600 GB SSD. However, if the RAID 0 configuration is employed, the RAID controller is to satisfy the condition that the storage devices are equal to each other in storage capacity. The SSDs in use are equal to each other in storage capacity. For example, if a system is designed to have a spool capacity of 2.4 TB, three 800 GB SSDs are used.

Since the number of slots available on a server forming the controller 10 is subject to a limit, it may be difficult to mount all the SSDs in the slots as the number of SSDs increases. It is desired that the number of SSDs in use is minimized while a desired spool capacity is attained.

In accordance with the second exemplary embodiment, the control unit 44 performs software striping control instead of using a hardware RAID controller. The write speed is thus increased by using multiple SSDs that are different in storage capacity.

Figure 10:
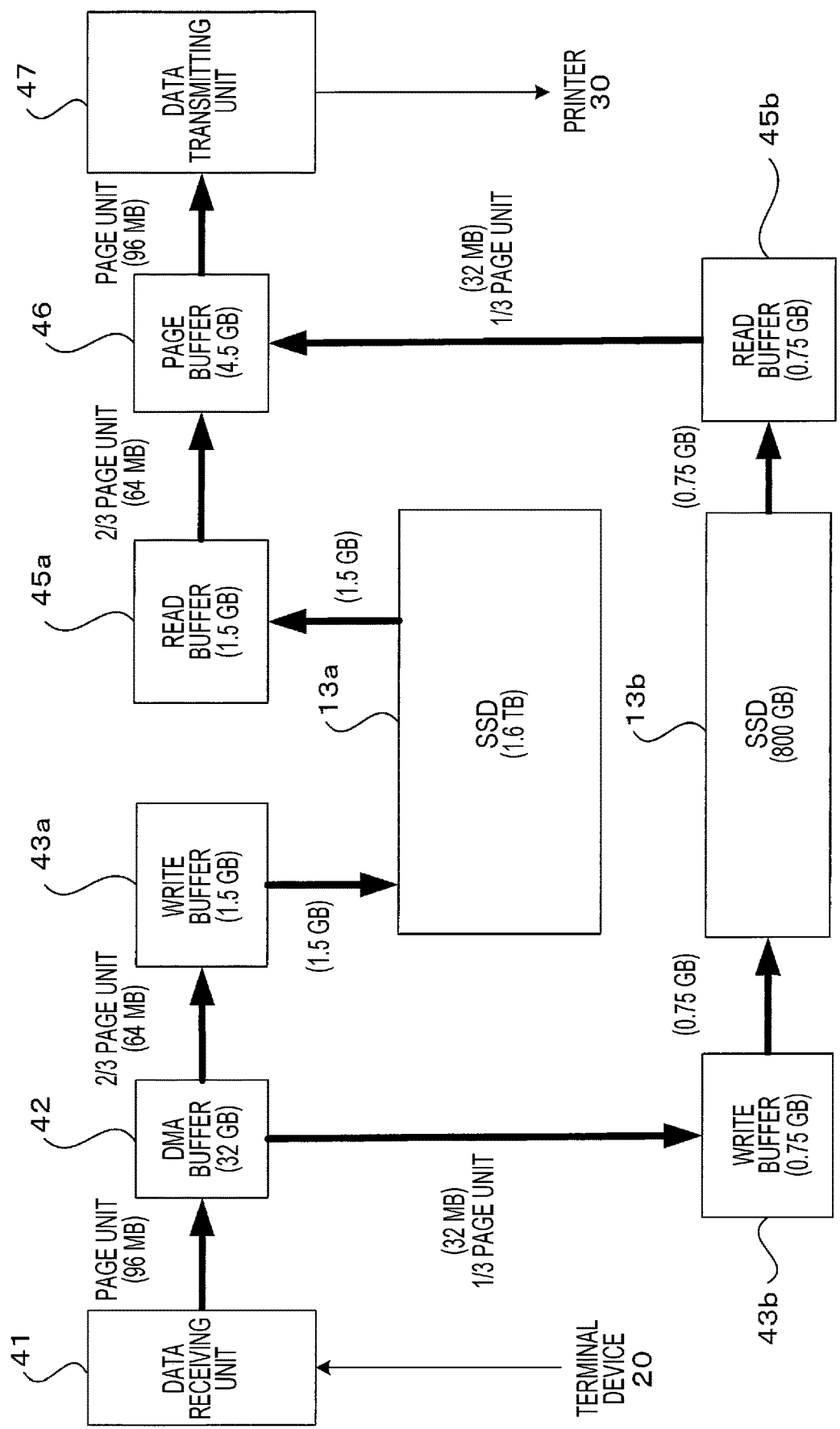
FIG. 10 illustrates a transfer operation of print data performed by the controller of the second exemplary embodiment of the disclosure.

FIG. 10 illustrates how the print data is transferred in the controller 10A of the second exemplary embodiment.

In accordance with the second exemplary embodiment, the storage capacities of the SSD 13a and SSD 13b are 1.6 TB (1600 GB) and 800 GB as illustrated in FIG. 10, respectively. The maximum storage capacities of write buffers 43a and 43b are 1.5 GB and 0.75 GB, respectively. The maximum capacities of read buffers 45a and 45b are 1.5 GB and 0.75 GB, respectively.

The write buffers 43a and 43b temporarily store the print data before being written on the two SSDs 13a and 13b. The DMA buffer 42 stores data transferred from a preceding stage, and transfers the data to the write buffers 43a and 43b serving as succeeding stages in steps of a predetermined data amount.

The two write buffers 43a and 43b are configured to have maximum store capacities responsive to the corresponding SSDs 13a and 13b.

Specifically, the write buffer 43a that temporarily stores the print data before being written to the SSD 13a having a storage capacity of 1.6 TB has a maximum storage capacity of 1.5 GB. The write buffer 43b that temporarily stores the print data before being written on the SSD 13b having a storage capacity of 0.8 TB has a maximum storage capacity of 0.75 GB.

The control unit 44 of the second exemplary embodiment successively transfers to the two write buffers 43a and 43b the print data stored on the DMA buffer 42 in steps of a data amount of a page that is to be written on the corresponding SSD in a batch. When the amount of print data stored on the two write buffers 43a and 43b reaches the maximum storage amount, the print data stored on the two write buffers 43a and 43b are respectively written on the two SSDs 13a and 13b in a batch.

Specifically, the control unit 44 of the second exemplary embodiment respectively transfers to the write buffers 43a and 43b data of 64 MB and data of 32 MB into which data of 96 MB for one page of the print data stored on the DMA buffer 42 is segmented according to the storage capacities of the SSDs 13a and 13b.

When the amounts of the print data respectively stored on the write buffers 43a and 43b become 1.5 GB and 0.75 GB, the control unit 44 performs control to write the print data stored on the write buffers 43a and 43b onto the SSDs 13a and 13b in a batch.

Figure 11:
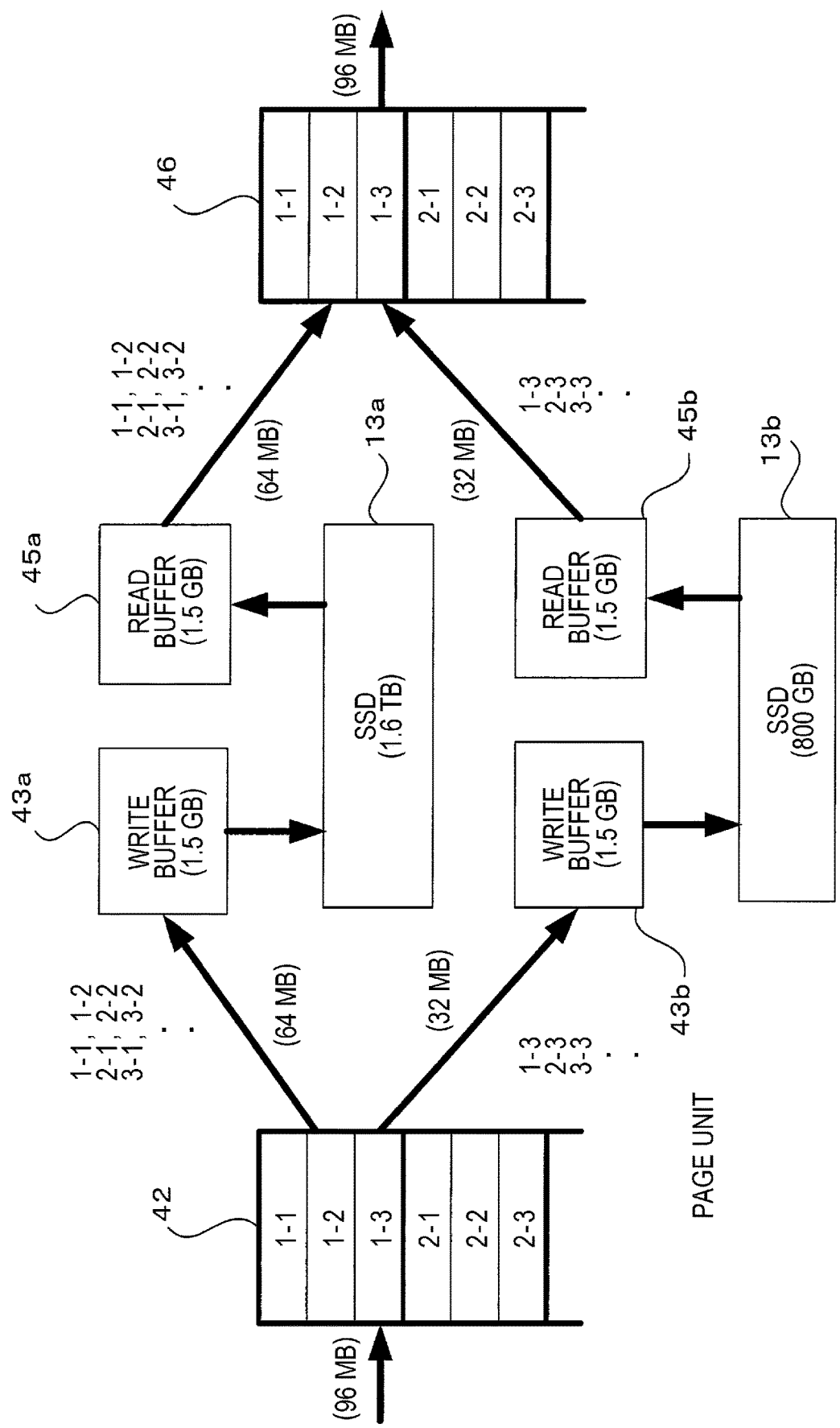
FIG. 11 illustrates a transfer operation that transfers the print data from a DMA buffer to write buffers in steps of a page unit.

FIG. 11 illustrates a transfer operation that transfers the print data from the DMA buffer 42 to the write buffers 43a and 43b in steps of a page unit.

Specifically, as illustrated in FIG. 11, the control unit 44 splits into three segments the print data stored on the DMA buffer 42 and transfers two-thirds of the print data to the write buffer 43a and one-third of the print data to the write buffer 43b. Referring to FIG. 11, a first page is segmented into print data segments 1-1, 1-2, and 1-3, the print data segments 1-1 and 1-2 are transferred to the write buffer 43a, and the print data segment 1-3 is transferred to the write buffer 43b.

The data segments are read from the SSDs 13a and 13b are combined on the page buffer 46 into the print data of one page after being temporarily stored on the read buffers 45a and 45b.

In accordance with the second exemplary embodiment, the print data segments in the striping control are stored on the write buffers 43a and 43b until the amounts of data on the write buffers 43a and 43b reach the storage data of 1.5 GB and 0.7 GB, respectively. The data are then written on the SSDs 13a and 13b in a batch. Even if the writing of the individual print data from the DMA buffer 42 is varied, variations are averaged through a series of write operations, and any decrease does not occur in the write speed.

In the RAID configuration with two SSDs 13a and 13b of the second exemplary embodiment, the overall write speed may be expected to about 1.5 times the overall write speed of the configuration with the single SSD in the first exemplary embodiment.

In the configuration with the two SSDs 13a and 13b of the second exemplary embodiment, the write speed as high as 1155 MB/s (=770 MB/s×1.5) may be attainable.

In the above example, the two SSDs 13a and 13b are employed. The print data may be transferred using more SSDs. For example, FIGS. 12 and 13 illustrate a configuration including four SSDs 13a through 13d.

In the configuration with the four SSDs 13a through 13d, four write buffers 43a through 43d and four read buffers 45a through 45d are employed correspondingly for the SSDs 13a through 13d.

Figure 12:
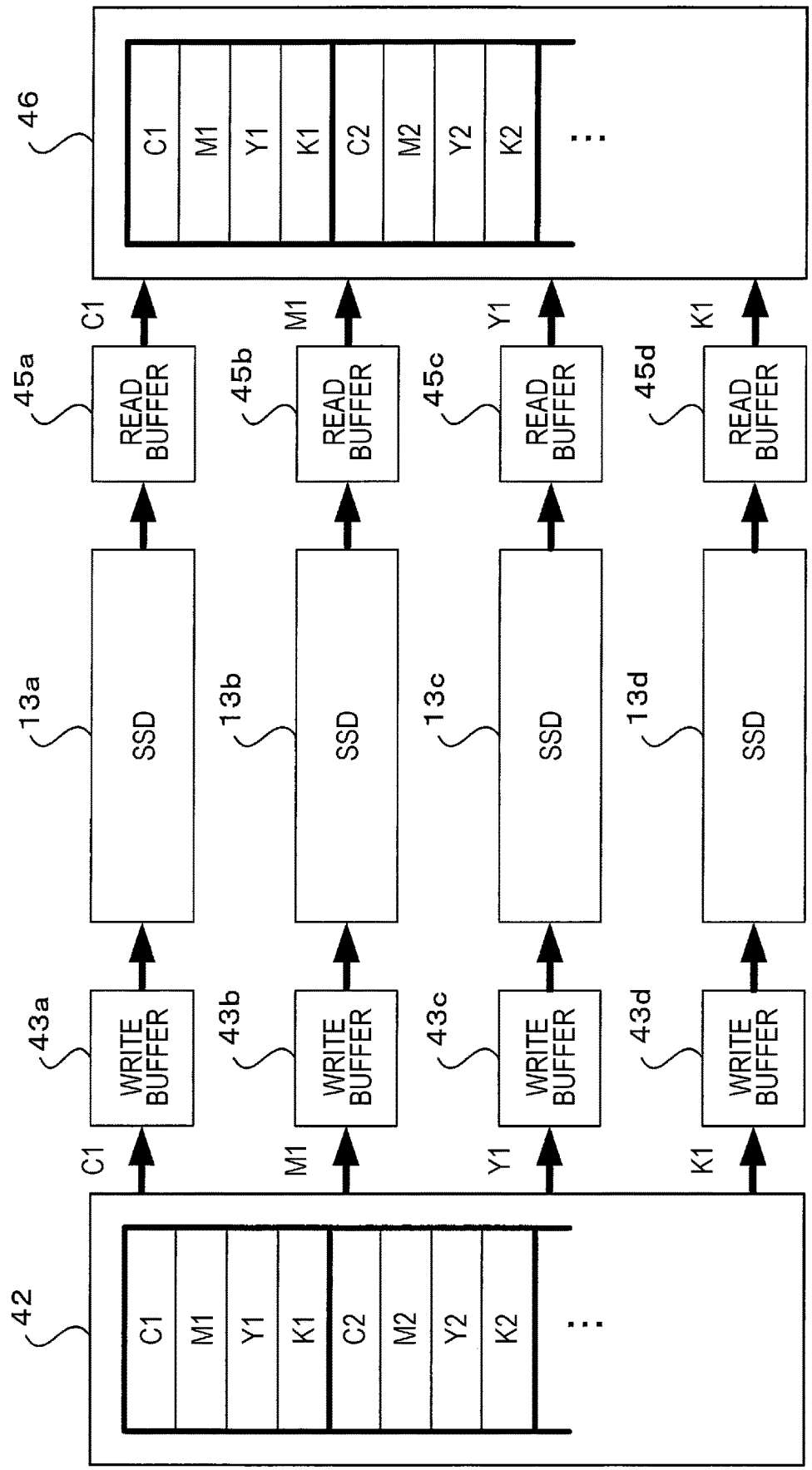
FIG. 12 illustrates color printing that is performed by using four SSDs.
Figure 13:
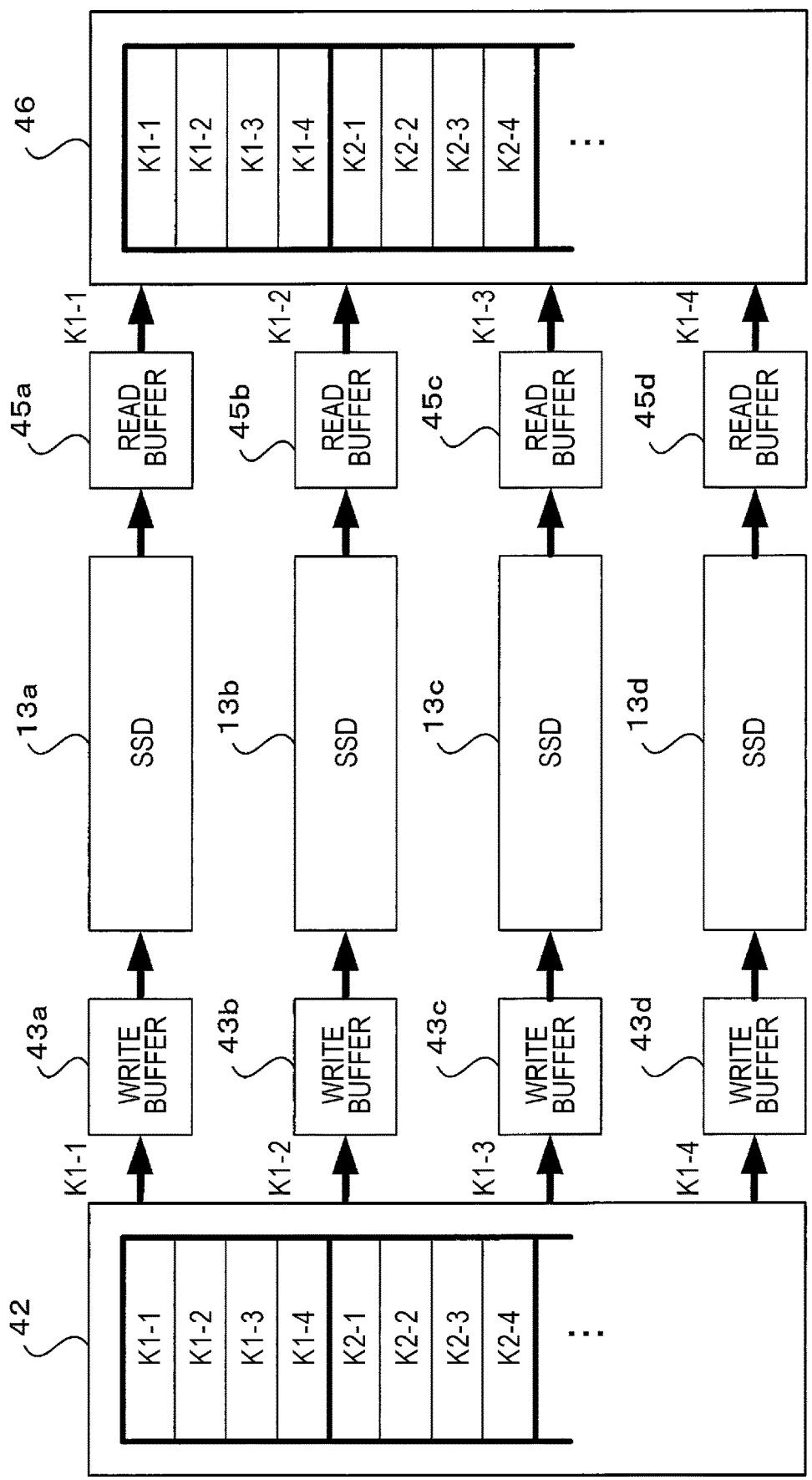
FIG. 13 illustrates monochrome printing that is performed by using four SSDs.

As illustrated in FIG. 12 in this configuration, if color printing is performed, the print data for cyan, magenta, yellow, and black (CMYK) colors are respectively segmented for the SSDs 13a through 13d. The four SSDs 13a through 13d are uniformly used.

If the control illustrated in FIG. 12 is performed for monochrome printing, only the SSD 13d for the print data for black (K) color may be used.

The flash memory is subject to the limit on the number of write cycles because of the structure thereof. If the data writing is repeated on only one particular SSD, the number of write cycles may exceed the limit, possibly leading to a shorter system life span.

If the print data is for color printing in the configuration, the control unit 44 performs control such that the print data for CMYK colors is spread across the four SSDs 13a through 13d for storage. If the print data is for monochrome printing in the configuration, the control unit 44 performs control such that the print data for black is spread across the four SSDs 13a through 13d.

Specifically, as illustrated in FIG. 13, the control unit 44 segments the print data for one page of K color into four print data segments K 1-1, 1-2, 1-3, and 1-4, and then respectively transfers these data segments to the write buffers 43a through 43d. To this end, the four print data segments K 1-1, 1-2, 1-3, and 1-4 are written on the SSDs 13a through 13d.

The four print data segments K 1-1, 1-2, 1-3, and 1-4 are respectively read from the SSDs 13a through 13d, and combined on the page buffer 46 after being temporarily stored on the read buffers 45a through 45d.

Modifications

In accordance with the exemplary embodiments, the spool control is performed to transfer the print data to the printer 30. The disclosure is not limited to this configuration. The disclosure may also be equally applicable to an information processing apparatus that transfers data to a succeeding stage after temporarily storing the data from a preceding stage.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a non-volatile semiconductor storage device including a flash memory;
   a write buffer memory that stores data that is to be written onto the non-volatile semiconductor storage device;
   a controller that performs control to write, in a batch and onto the non-volatile semiconductor storage device, the data stored on the write buffer memory when an amount of the data stored on the write buffer memory reaches a predetermined amount of data; and
   a read buffer memory that stores data read from the non-volatile semiconductor storage device,
   wherein the controller performs control to read in a batch the predetermined amount of data from the non-volatile semiconductor storage device, to store the read data on the read buffer memory, and to successively transfer the data stored on the read buffer memory to a succeeding stage in steps of a data unit.

2. The information processing apparatus according to claim 1, wherein the predetermined amount of data is configured to be a value that causes a data write speed to the non-volatile semiconductor storage device to be higher than a data write speed at which data transmitted from a stage preceding to the write buffer memory is directly written onto the non-volatile semiconductor storage device in steps of a data unit of the data.

3. The information processing apparatus according to claim 2, wherein the predetermined amount of data is set to be a larger value as a storage capacity of the non-volatile semiconductor storage device serving as a write destination is larger.

4. The information processing apparatus according to claim 3, wherein the predetermined amount of data corresponds to a maximum storage capacity of the write buffer memory.

5. The information processing apparatus according to claim 2, wherein the predetermined amount of data corresponds to a maximum storage capacity of the write buffer memory.

6. The information processing apparatus according to claim 1, wherein the predetermined amount of data corresponds to a maximum storage capacity of the write buffer memory.

7. The information processing apparatus according to claim 1, wherein a maximum storage capacity of the write buffer memory is equal to a maximum storage capacity of the read buffer memory,
wherein the predetermined amount of data is equal to each of the maximum storage capacity of the write buffer memory and the maximum storage capacity of the read buffer memory, and
wherein the controller alternates between data writing onto the non-volatile semiconductor storage device and data reading from the non-volatile semiconductor storage device.

8. An information processing apparatus comprising:
a plurality of non-volatile semiconductor storage devices, each including a flash memory;
a data storage unit that stores data transmitted from a preceding stage and transmits the data as a predetermined data unit to a succeeding stage;
a plurality of write buffer memories that respectively store pieces of data that are to be respectively written onto the non-volatile semiconductor storage devices; and
a controller that performs control to successively transfer, from the data storage unit to the write buffer memories, pieces of data into which the data unit is segmented to have amounts according to storage capacities of the non-volatile semiconductor storage devices, and to respectively write, in a batch and on the non-volatile semiconductor storage devices, the pieces of data stored on the write buffer memories, when amounts of data stored on the write buffer memories reach predetermined amounts of data.

9. The information processing apparatus according to claim 8, wherein each of the write buffer memories is configured to have a maximum storage capacity corresponding to a data capacity of a corresponding non-volatile semiconductor storage device of the non-volatile semiconductor storage devices.

10. The information processing apparatus according to claim 8, wherein the data is print data that is to be transferred to a printer,
wherein the data unit forming the data is a page unit,
wherein if the print data is for color printing, the controller performs control such that the print data of each color is separately written onto a corresponding non-volatile semiconductor storage device of the non-volatile semiconductor storage devices, and if the print data is for monochrome printing, the controller performs control such that the print data for black is segmented into a plurality of pieces of data, and the plurality of segmented pieces of data are respectively stored on the non-volatile semiconductor storage devices.

* * * * *